US012699073B2

(12) United States Patent
　　Jung et al.

(10) Patent No.:　US 12,699,073 B2
(45) Date of Patent:　　　Aug. 4, 2026

(54) APPARATUS AND METHOD FOR ANALYZING ROAD SURFACE CONDITION BASED ON VEHICLE NOISE

(71) Applicant: SK Planet Co., Ltd., Seongnam-si (KR)

(72) Inventors: JongHee Jung, Yongin-si (KR); Yeonghyeon Park, Cheonan-si (KR); JoonSung Lee, Seoul (KR)

(73) Assignee: SK Planet Co., Ltd., Seongnam-si (KR)

( * ) Notice: Subject to any disclaimer, the term of this patent is extended or adjusted under 35 U.S.C. 154(b) by 116 days.

(21) Appl. No.: 18/750,315

(22) Filed: Jun. 21, 2024

(65) Prior Publication Data

US 2024/0337624 A1　　Oct. 10, 2024

Related U.S. Application Data

(62) Division of application No. 17/903,498, filed on Sep. 6, 2022, now Pat. No. 12,442,796.

(30) Foreign Application Priority Data

Nov. 25, 2021　(KR) ........................ 10-2021-0164694
Dec. 10, 2021　(KR) ........................ 10-2021-0177056

(51) Int. Cl.
*G01N 29/12*　　　(2006.01)
*G01D 21/02*　　　(2006.01)
*G01N 29/44*　　　(2006.01)

(52) U.S. Cl.
CPC ............. *G01N 29/12* (2013.01); *G01D 21/02* (2013.01); *G01N 29/4481* (2013.01); *G01N 2291/0232* (2013.01)

(58) Field of Classification Search
CPC . B60K 35/80; B60T 2210/12; B60T 2210/13; B60T 2210/14; B60T 2210/10;
(Continued)

(56) References Cited

U.S. PATENT DOCUMENTS 5,852,243　A　　12/1998　Chang
10,930,147　B2　　2/2021　Oyabu
(Continued)

FOREIGN PATENT DOCUMENTS

WO　　WO-2020261427　A1　12/2020

OTHER PUBLICATIONS

Bischof, Horst & Godec, Martin & Leistner, Christian & Rinner, Bernhard & Starzacher, Andreas. (2010). Autonomous Audio-Supported Learning of Visual Classifiers for Traffic Monitoring.. IEEE Intelligent Systems. 25. 15-23. (Year: 2010).*
(Continued)

*Primary Examiner* — Catherine T. Rastovski
*Assistant Examiner* — Eric Sebastian Von Wald
(74) *Attorney, Agent, or Firm* — WTA IP Law P.C.

(57)　　　　　　　ABSTRACT

Deriving a dangerous area of a road based on a vehicle's noise generated on the road or analyzing a road surface condition based on a driving noise for each vehicle type. An audio signal is collected by a sensor device and send to a noise processing unit. The noise processing unit generates an attenuated audio signal by attenuating a noise other than a noise-of-interest including at least one of a vehicle horn noise and a vehicle sudden brake noise in the received audio signal. An information processing unit detects the noise-of-interest by analyzing the attenuated audio signal through a learned detection model, and establishes a road area within a predetermined radius from the sensor device as the dangerous area of the road based on an accumulated number of times the noise-of-interest is detected.

8 Claims, 11 Drawing Sheets

(58) Field of Classification Search

CPC ............. B60T 2210/122; B60W 50/14; B60W 2050/143; B60W 40/06; B60W 2050/0052; B60W 2050/0075; B60W 2420/403; B60W 2552/00; B60W 2552/05; B60W 2555/20; B60W 40/02; B60W 40/04; B60W 40/10; B60W 50/0097; G01D 21/02; G01H 3/00; G01H 17/00; G01N 29/12; G01N 29/14; G01N 29/4481; G01N 29/4454; G01N 2291/0232; G01N 29/46; G01N 29/4427; G01N 29/4472; G01S 15/02; G05B 11/36; G05B 13/027; G05B 23/0254; G06F 3/15; G06F 2111/10; G06F 18/214; G06N 3/08; G06N 20/20; G06N 3/0464; G06N 3/02; G06T 1/0007; G06V 20/60; G08B 19/02; G08G 1/0116; G08G 1/0141; G08G 1/0129; G08G 1/096716; G08G 1/096783; G08G 1/01; G08G 1/012; G08G 1/04; G08G 1/164; G08G 1/162; G08G 1/163; G08G 1/166; G08G 1/048; H04W 4/029

See application file for complete search history.

(56) References Cited

U.S. PATENT DOCUMENTS

| | | | |
|---|---|---|---|
| 12,249,157 B2 * | 3/2025 | Peters | .................. H04W 4/029 |
| 2018/0210074 A1 | 7/2018 | Hoare | |
| 2020/0057895 A1 * | 2/2020 | Shim | ......................... G06T 7/97 |
| 2020/0242287 A1 | 7/2020 | Yamanouchi | |
| 2021/0101603 A1 * | 4/2021 | Lee | ......................... B60T 8/172 |
| 2022/0126864 A1 | 4/2022 | Moustafa | |
| 2023/0324343 A1 * | 10/2023 | Sun | ......................... G01N 29/46 |
| | | | 73/579 |

OTHER PUBLICATIONS

Office action of U.S. Appl. No. 17/903,498 mailed on Aug. 15, 2024.

Nolte, Marcus, Nikita Kister, and Markus Maurer. "Assessment of deep convolutional neural networks for road surface classification." 2018 21st International Conference on Intelligent Transportation Systems (ITSC). IEEE, 2018. (Year: 2018).

Foggia, Pasquale & Petkov, Nicolai & Saggese, Alessia & Strisciuglio, Nicola & Vento, Mario. (2015). Audio Surveillance of Roads: A System for Detecting Anomalous Sounds. IEEE Transactions on Intelligent Transportation Systems. 10.1109/TITS.2015.2470216. (Year: 2015).

Almaadeed, N.; Asim, M.; Al-Maadeed, S.; Bouridane, A; Beghdadi, A Automatic Detection and Classification of Audio Events for Road Surveillance Applications. Sensors 2018, 18, 1858. https://doi.org/10.3390/s18061858 (Year: 2018).

Final Office Action of the parent U.S. Appl. No. 17/903,498 mailed on Jan. 24, 2025.

* cited by examiner

Figure 5:
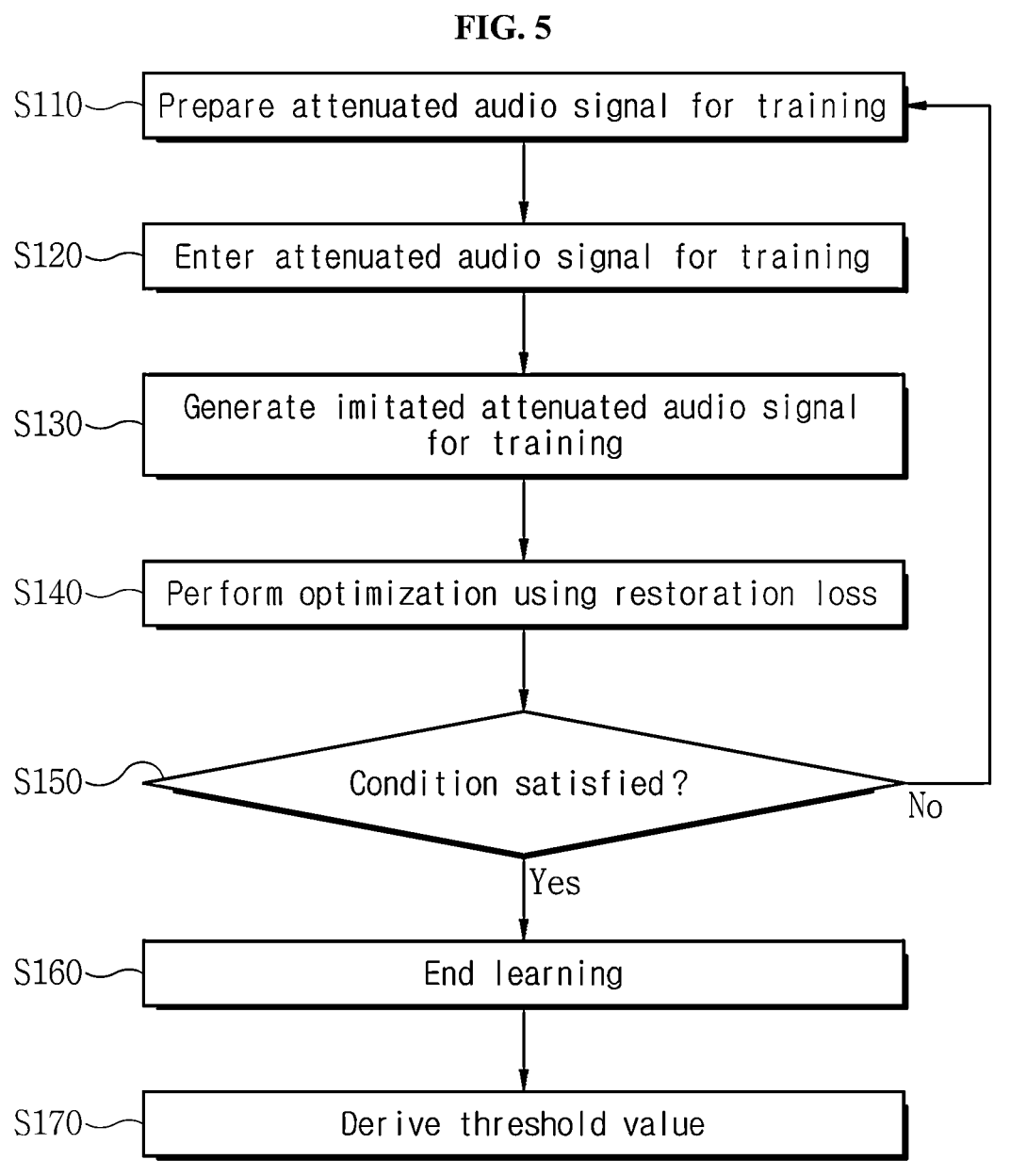

S110 — Prepare attenuated audio signal for training

S120 — Enter attenuated audio signal for training

S130 — Generate imitated attenuated audio signal for training

S140 — Perform optimization using restoration loss

S150 — Condition satisfied?

No

Yes

S160 — End learning

S170 — Derive threshold value

FIG. 6

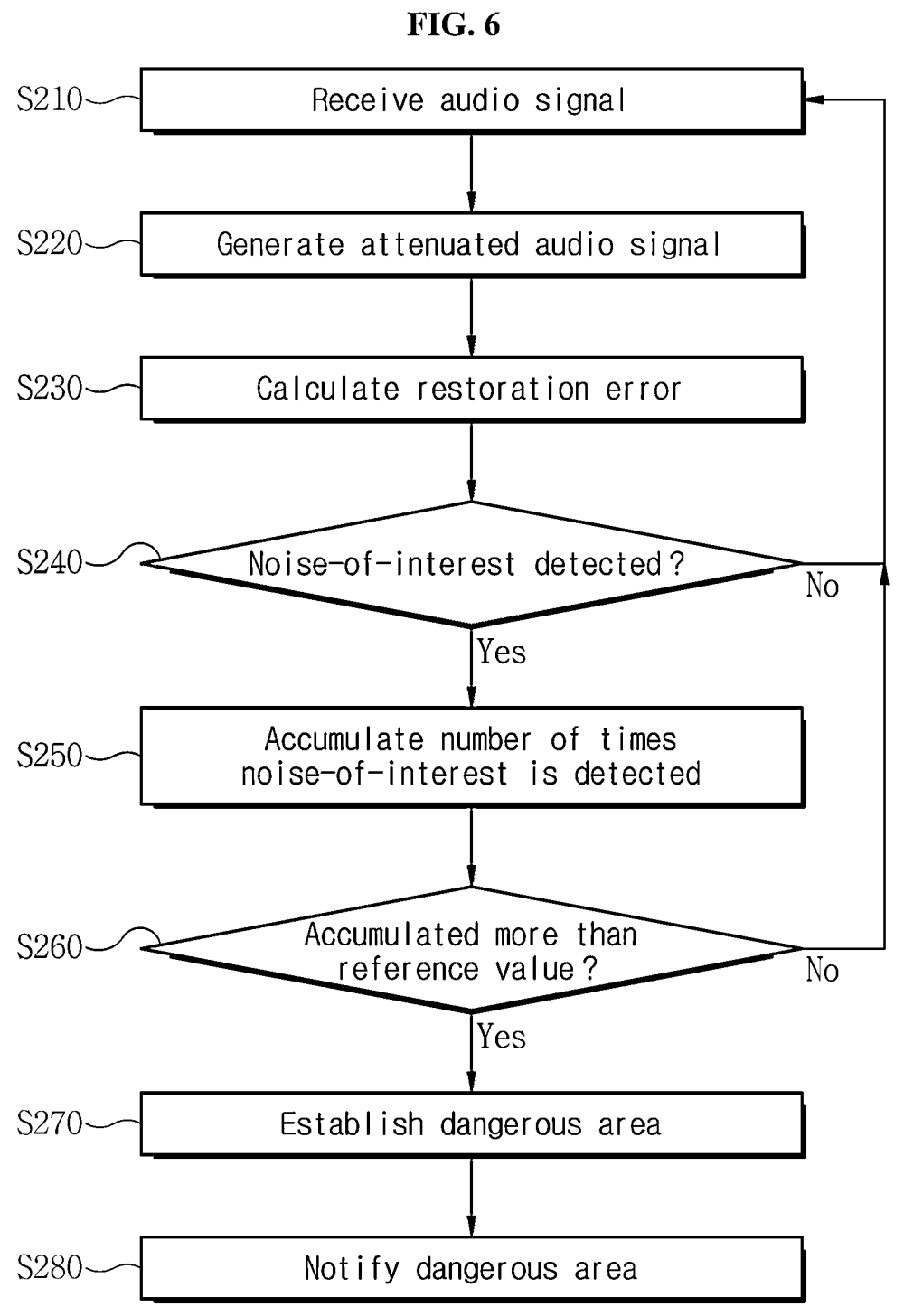

S210 — Receive audio signal

S220 — Generate attenuated audio signal

S230 — Calculate restoration error

S240 — Noise-of-interest detected?

No

Yes

S250 — Accumulate number of times noise-of-interest is detected

S260 — Accumulated more than reference value?

No

Yes

S270 — Establish dangerous area

S280 — Notify dangerous area

Figure 9:
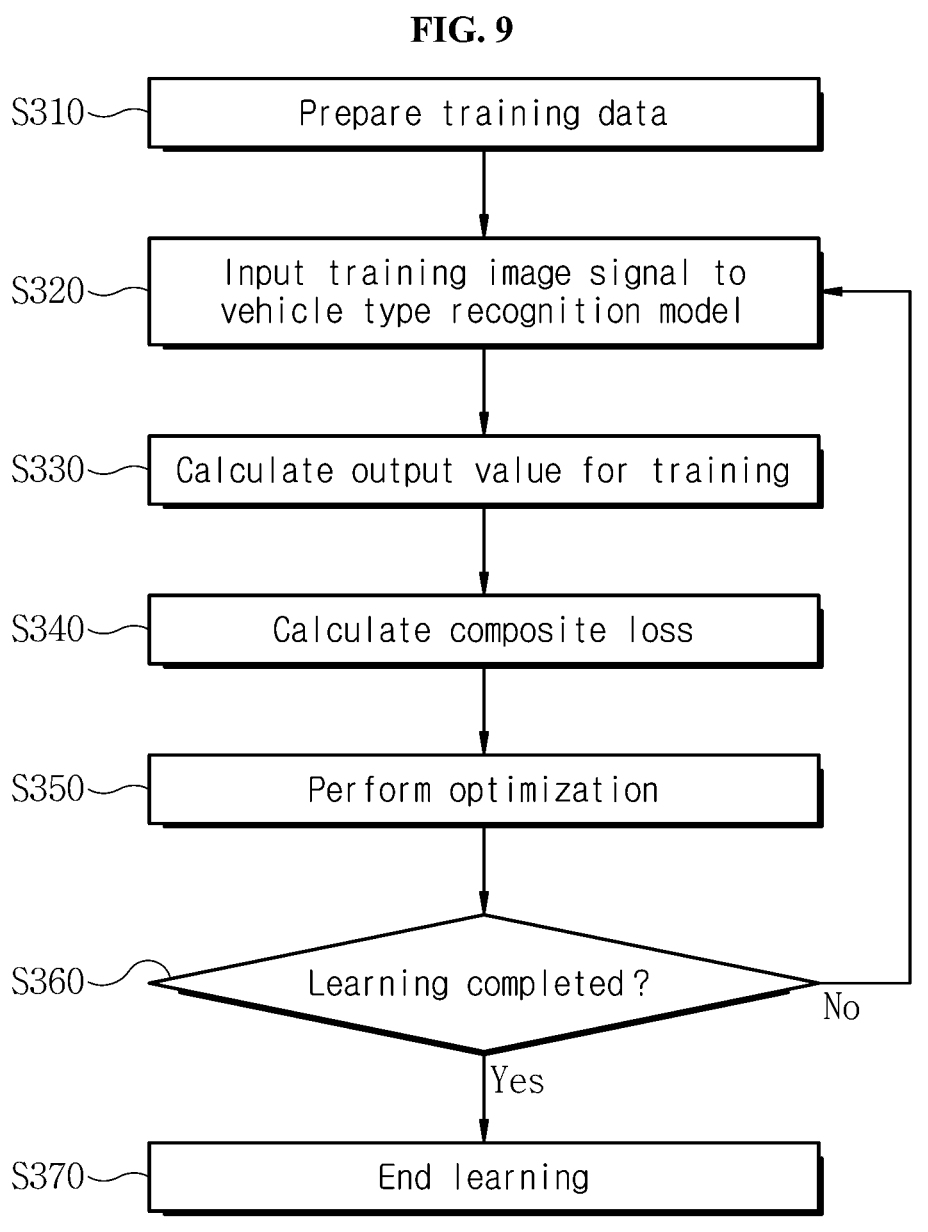

S310 — Prepare training data

S320 — Input training image signal to vehicle type recognition model

S330 — Calculate output value for training

S340 — Calculate composite loss

S350 — Perform optimization

S360 — Learning completed ?

No

Yes

S370 — End learning

FIG. 11

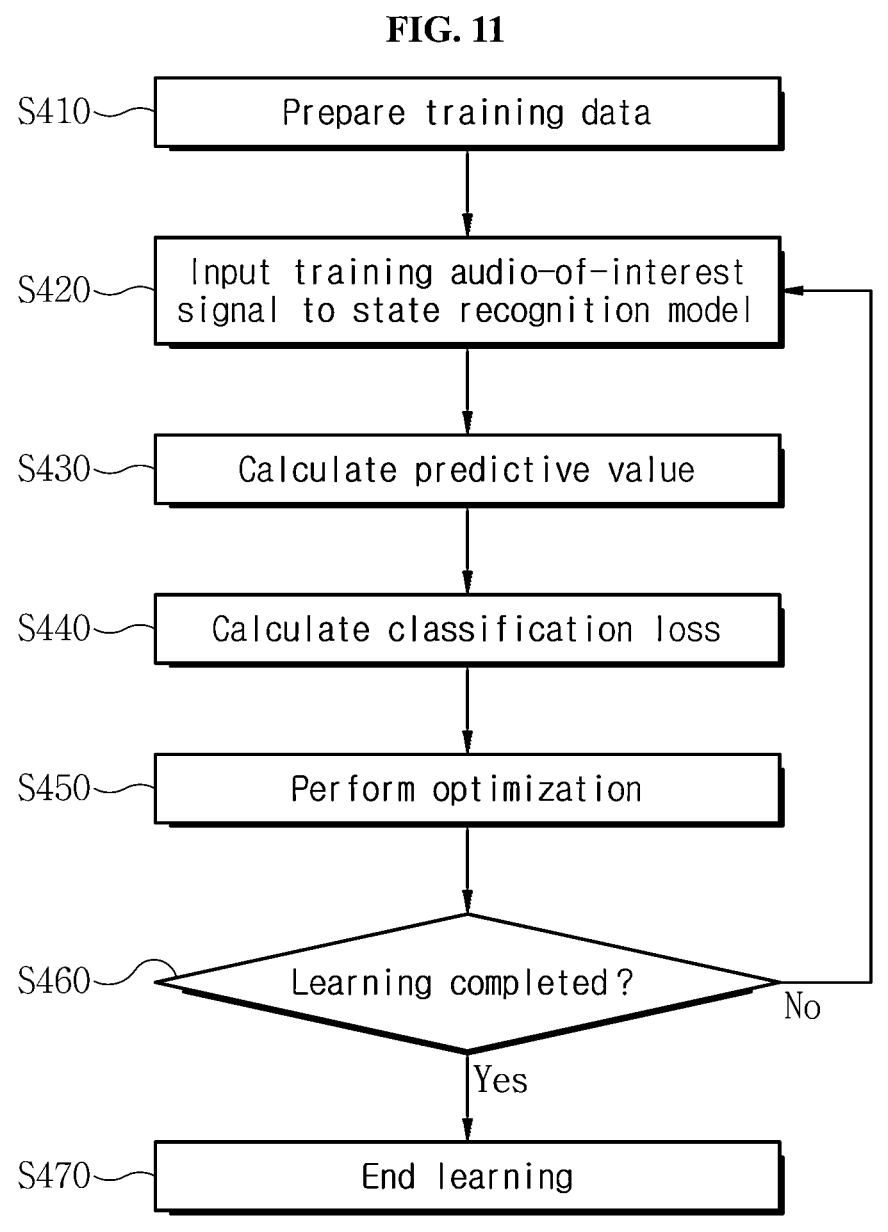

S410 — | Prepare training data |

S420 — | Input training audio-of-interest signal to state recognition model |

S430 — | Calculate predictive value |

S440 — | Calculate classification loss |

S450 — | Perform optimization |

S460 — < Learning completed? >     No

Yes

S470 — | End learning |

APPARATUS AND METHOD FOR ANALYZING ROAD SURFACE CONDITION BASED ON VEHICLE NOISE

CROSS-REFERENCE TO RELATED APPLICATIONS

The present application is a divisional of U.S. patent application Ser. No. 17/903,498, filed on Sep. 6, 2022, which claims the benefit of priority to Korean Patent Application Nos. 10-2021-0164694, filed on Nov. 25, 2021, and 10-2021-0177056, filed on Dec. 10, 2021, which are incorporated by reference herein in their entirety.

TECHNICAL FIELD

The present disclosure relates to a technology for analyzing a road surface condition, and more particularly, to an apparatus and method for deriving a dangerous area of a road based on a vehicle's noise generated on the road or analyzing a road surface condition based on a driving noise for each vehicle type.

BACKGROUND ART

In general, road surface conditions due to bad weather, such as hydroplaning, icy, and snow-covered conditions, are used as important information for efficient road management and traffic safety. For example, traffic accidents due to black ice (or clear ice) are frequent recently. Black ice refers to a phenomenon that a thin layer of ice is formed as if coated on the road surface, and this phenomenon is caused when snow and moisture get entangled with soot and dust in the air and then freeze to black through cracks in the road surface. Black ice usually occurs in the winter in shady and cool places such as on bridges, at tunnel entrances, on shady roads, or in the shade of mountain corners.

The existing road surface condition management utilizes equipment called a road weather information system. The road weather information system can provide road surface condition information and atmospheric condition prediction information in real time by using the data of the weather observation system. Therefore, the real-time information provided by the road weather information system is useful for safe driving of drivers or for making decisions about road management by road operators. However, the road weather information system has a limitation in its dissemination because equipment installation and maintenance costs are very high.

SUMMARY

Accordingly, the present disclosure is intended to provide an apparatus and method for deriving a dangerous area of a road, based on an audio signal that is a vehicle's noise generated on the road, and notifying the dangerous area.

In addition, the present disclosure is intended to provide an apparatus and method for analyzing a road surface condition, based on a driving noise for each vehicle type.

According to an embodiment of the present disclosure, a method for deriving a dangerous area of a road may include receiving, by a noise processing unit, an audio signal collected by a sensor device installed around the road; generating, by the noise processing unit, an attenuated audio signal by attenuating a noise other than a noise-of-interest including at least one of a vehicle horn noise and a vehicle sudden brake noise in the received audio signal; detecting, by an information processing unit, the noise-of-interest by analyzing the attenuated audio signal through a learned detection model; and establishing, by the information processing unit, a road area within a predetermined radius from the sensor device as the dangerous area of the road when an accumulated number of times the noise-of-interest is detected within a predetermined period is greater than or equal to a predetermined reference value.

In the method, detecting the noise-of-interest may include inputting the attenuated audio signal, by the information processing unit, to the learned detection model; when the detection model compresses and restores the attenuated audio signal and thereby calculates an imitated attenuated audio signal that imitates the attenuated audio signal, calculating, by the information processing unit, a restoration error indicating a difference between the inputted attenuated audio signal and the imitated attenuated audio signal; and detecting, by the information processing unit, the inputted attenuated audio signal as the noise-of-interest when the calculated restoration error is less than a predetermined threshold value.

The method may further include, before receiving the audio signal, preparing, by a learning unit, an attenuated audio signal for training, which is a signal obtained by attenuating a noise other than the noise-of-interest including at least one of the vehicle horn noise and the vehicle sudden brake noise; inputting, by the learning unit, the attenuated audio signal for training to a detection model that does not complete learning; generating, by the detection model, an imitated attenuated audio signal for training that imitates the attenuated audio signal for training, by compressing and restoring the attenuated audio signal for training; calculating, by the learning unit, a restoration loss that is a difference between the attenuated audio signal for training and the imitated attenuated audio signal for training; and performing, by the learning unit, optimization of updating a weight of the detection model to minimize the restoration loss.

The method may further include, before receiving the audio signal, and after performing the optimization, calculating, by the learning unit, the threshold value according to Equation $\theta = \mu + (k \times \sigma)$, wherein $\mu$ denotes an average of a mean squared error between a plurality of test attenuated audio signals and a plurality of test imitated attenuated audio signals corresponding to the plurality of test attenuated audio signals, wherein o denotes a standard deviation of the mean squared error between the plurality of test attenuated audio signals and the plurality of test imitated attenuated audio signals corresponding to the plurality of test attenuated audio signals, and wherein k denotes a weight for the standard deviation.

According to an embodiment of the present disclosure, an apparatus for deriving a dangerous area of a road may include a noise processing unit configured to receive an audio signal collected by a sensor device installed around the road, and to generate an attenuated audio signal by attenuating a noise other than a noise-of-interest including at least one of a vehicle horn noise and a vehicle sudden brake noise in the received audio signal; and an information processing unit configured to detect the noise-of-interest by analyzing the attenuated audio signal through a learned detection model, and to establish a road area within a predetermined radius from the sensor device as the dangerous area of the road when an accumulated number of times the noise-of-interest is detected within a predetermined period is greater than or equal to a predetermined reference value.

In the apparatus, the information processing unit may be configured to input the attenuated audio signal to the learned detection model; when the detection model compresses and restores the attenuated audio signal and thereby calculates an imitated attenuated audio signal that imitates the attenuated audio signal, calculate a restoration error indicating a difference between the inputted attenuated audio signal and the imitated attenuated audio signal; and detect the inputted attenuated audio signal as the noise-of-interest when the calculated restoration error is less than a predetermined threshold value.

The apparatus may further include a learning unit configured to prepare an attenuated audio signal for training, which is a signal obtained by attenuating a noise other than the noise-of-interest including at least one of the vehicle horn noise and the vehicle sudden brake noise; to input the attenuated audio signal for training to a detection model that does not complete learning; when the detection model generates an imitated attenuated audio signal for training that imitates the attenuated audio signal for training, by compressing and restoring the attenuated audio signal for training, to calculate a restoration loss that is a difference between the attenuated audio signal for training and the imitated attenuated audio signal for training; and to perform optimization of updating a weight of the detection model to minimize the restoration loss.

In the apparatus, the learning unit may be configured to, after performing the optimization, calculate the threshold value according to Equation $\theta=\mu+(k\times\sigma)$, wherein $\mu$ denotes an average of a mean squared error between a plurality of test attenuated audio signals and a plurality of test imitated attenuated audio signals corresponding to the plurality of test attenuated audio signals, wherein $\sigma$ denotes a standard deviation of the mean squared error between the plurality of test attenuated audio signals and the plurality of test imitated attenuated audio signals corresponding to the plurality of test attenuated audio signals, and wherein k denotes a weight for the standard deviation.

According to an embodiment of the present disclosure, a method for analyzing a road surface condition may include receiving, by a signal processing unit, an image signal of a vehicle and an audio signal that is a noise generated on a road surface by driving of the vehicle; generating, by the signal processing unit, an audio-of-interest signal by detecting an audio signal of a frequency-of-interest band from the received audio signal; and recognizing, by a recognition unit, the road surface condition by analyzing the image signal and the audio-of-interest signal through one of a learned vehicle type recognition model and a plurality of learned state recognition models.

In the method, recognizing the road surface condition may include recognizing, by the recognition unit, a vehicle type by analyzing the image signal through the learned vehicle type recognition model; selecting, by the recognition unit, a learned state recognition model corresponding to the recognized vehicle type from among the plurality of state recognition models learned for respective vehicle types; computing, by the recognition unit, a predictive value, which is a probability predicted for each of a plurality of road surface conditions, by analyzing the audio-of-interest signal through the selected state recognition model; and recognizing, by the recognition unit, the road surface condition according to the predictive value.

In the method, recognizing the vehicle type may include inputting, by the recognition unit, the image signal to the learned vehicle type recognition model; calculating, by the vehicle type recognition model, an output value including a bounding box indicating an area occupied by a vehicle object in the image signal and a confidence indicating a probability that the vehicle object in the bounding box belongs to each of a plurality of vehicle types by performing an operation in which a plurality of learned layer weights are applied to the image signal; and recognizing, by the recognition unit, the vehicle type of the vehicle object according to the confidence.

The method may further include, before receiving the audio signal, preparing, by a learning unit, training data including a training image signal and a label, the training image signal being obtained by photographing a vehicle, and the label including a ground-truth indicating an area occupied by the vehicle object contained in the training image signal and a vehicle type vector indicating the vehicle type of the vehicle object in the ground-truth; inputting, by the learning unit, the training image signal to a vehicle type recognition model that does not complete learning; calculating, by the vehicle type recognition model, an output value for training including a bounding box indicating an area occupied by a vehicle object in the image signal and a confidence indicating a probability that the vehicle object in the bounding box belongs to each of a plurality of vehicle types by performing a plurality of operations in which unlearned weights between layers are applied to the training image signal; calculating, by the learning unit, a composite loss including a coordinate loss indicating a coordinate difference between the bounding box and the ground-truth and a division loss indicating a difference between the confidence and the vehicle type vector; and performing, by the learning unit, optimization of updating a weight of the vehicle type recognition model to minimize the composite loss.

The method may further include, before receiving the audio signal, preparing, by the learning unit, training data including a training audio-of-interest signal and a label corresponding to the training audio-of-interest signal; inputting, by the learning unit, the training audio-of-interest signal to a state recognition model that does not complete learning; calculating, by the state recognition model, a predictive value for training indicating a predicted probability for each of a plurality of road surface conditions, by performing a plurality of operations in which unlearned weights between layers are applied; calculating, by the learning unit, a classification loss indicating a difference between the predictive value for training and the label; and performing, by the learning unit, optimization of updating a weight of the state recognition model to minimize the classification loss.

According to an embodiment of the present disclosure, an apparatus for analyzing a road surface condition may include a signal processing unit configured to receive an image signal of a vehicle and an audio signal that is a noise generated on a road surface by driving of the vehicle, and to generate an audio-of-interest signal by detecting an audio signal of a frequency-of-interest band from the received audio signal; and a recognition unit configured to recognize the road surface condition by analyzing the image signal and the audio-of-interest signal through one of a learned vehicle type recognition model and a plurality of learned state recognition models.

In the apparatus, the recognition unit may be configured to recognize a vehicle type by analyzing the image signal through the learned vehicle type recognition model; to select a learned state recognition model corresponding to the recognized vehicle type from among the plurality of state recognition models learned for respective vehicle types; to compute a predictive value, which is a probability predicted for each of a plurality of road surface conditions, by analyzing the audio-of-interest signal through the selected state recognition model; and to recognize the road surface condition according to the predictive value.

In the apparatus, the recognition unit may be configured to input the image signal to the learned vehicle type recognition model; and when the vehicle type recognition model calculates an output value including a bounding box indicating an area occupied by a vehicle object in the image signal and a confidence indicating a probability that the vehicle object in the bounding box belongs to each of a plurality of vehicle types by performing an operation in which a plurality of learned layer weights are applied to the image signal, to recognize the vehicle type of the vehicle object according to the confidence.

The apparatus may further include a learning unit configured to prepare training data including a training image signal and a label, the training image signal being obtained by photographing a vehicle, and the label including a ground-truth indicating an area occupied by the vehicle object contained in the training image signal and a vehicle type vector indicating the vehicle type of the vehicle object in the ground-truth; to input the training image signal to a vehicle type recognition model that does not complete learning; when the vehicle type recognition model calculates an output value for training including a bounding box indicating an area occupied by a vehicle object in the image signal and a confidence indicating a probability that the vehicle object in the bounding box belongs to each of a plurality of vehicle types by performing a plurality of operations in which unlearned weights between layers are applied to the training image signal, to calculate a composite loss including a coordinate loss indicating a coordinate difference between the bounding box and the ground-truth and a division loss indicating a difference between the confidence and the vehicle type vector; and to perform optimization of updating a weight of the vehicle type recognition model to minimize the composite loss.

The apparatus may further include a learning unit configured to prepare training data including a training audio-of-interest signal and a label corresponding to the training audio-of-interest signal; to input the training audio-of-interest signal to a state recognition model that does not complete learning; when the state recognition model calculates a predictive value for training indicating a predicted probability for each of a plurality of road surface conditions, by performing a plurality of operations in which unlearned weights between layers are applied, to calculate a classification loss indicating a difference between the predictive value for training and the label; and to perform optimization of updating a weight of the state recognition model to minimize the classification loss.

According to the present disclosure, an audio signal is collected using a sensor device installed on the side of the road and analyzed to establish a dangerous area. Because the dangerous area is quantitatively derived only based on an audio signal, infrastructure construction costs can be saved. Furthermore, because the dangerous area is established by detecting a horn noise and/or a sudden brake noise among audio signals, it is possible to determine the existence of the dangerous area even if there is no accident.

According to the present disclosure, a vehicle type is recognized through an image signal, and a vehicle's driving noise is analyzed using a model learned for each vehicle type to determine a road surface condition. Therefore, it is possible to provide a more accurate analysis result of the road surface condition.

DESCRIPTION OF DRAWINGS

FIG. 2 is a block diagram illustrating the configuration of a traffic server according to embodiments of the present disclosure.

FIG. 3 is a block diagram illustrating a detailed configuration of a controller of a traffic server according to the first embodiment of the present disclosure.

FIG. 5 is a flowchart illustrating a method for generating a detection model (DM) for deriving a dangerous area of a road based on a vehicle's noise generated on the road according to the first embodiment of the present disclosure.

FIG. 6 is a flowchart illustrating a method for deriving a dangerous area of a road based on a vehicle's noise generated on the road according to the first embodiment of the present disclosure.

FIG. 9 is a flowchart illustrating a method for generating a vehicle type recognition model according to the second embodiment of the present disclosure.

FIG. 11 is a flowchart illustrating a method for generating a state recognition model according to the second embodiment of the present disclosure.

DETAILED DESCRIPTION

Figure 1:
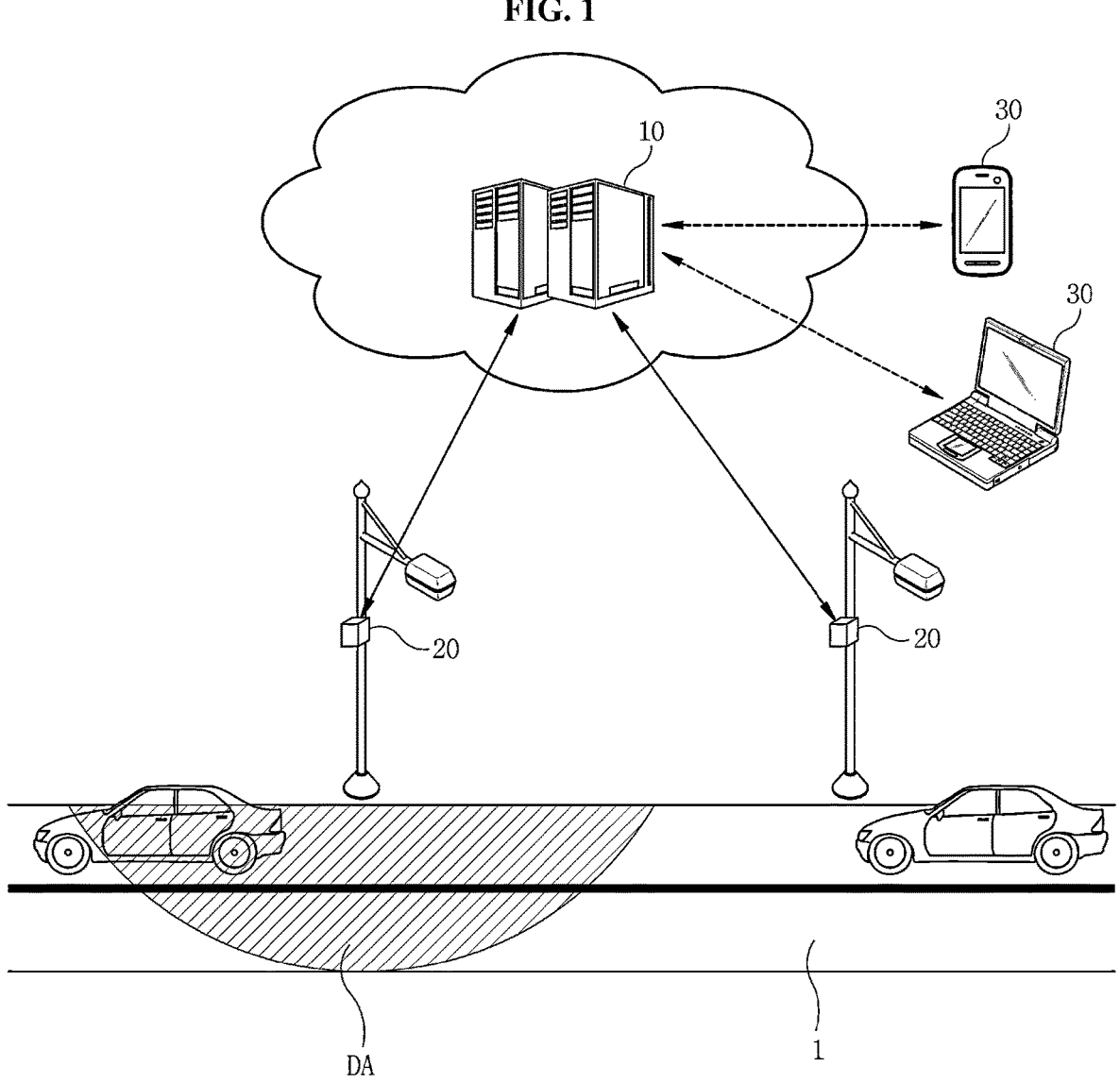
FIG. 1 is a diagram illustrating a system for analyzing a road surface condition based on a vehicle's noise according to embodiments of the present disclosure.

Now, embodiments of the present disclosure will be described in detail with reference to the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present disclosure. Also, the terms "comprise", "include", "have", and derivatives thereof mean inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

Also, in the following description, especially in claims, singular forms are intended to include plural forms unless the context clearly indicates otherwise. That is, the terms "a", "an", "one", and "the" may be used as both singular and plural meanings unless the context clearly indicates otherwise.

The term "module" or "unit" used herein may refer to a hardware or software component or device, such as a field programmable gate array (FPGA) or application specific integrated circuit (ASIC), which performs at least one particular function, operation, or task. A module or unit may be configured to reside on an addressable storage medium and configured to execute on one or more processors.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In the description and claims, the term "network" or "communication network" is defined as one or more data links that enable electronic data to be transmitted between computer systems and/or modules. When any information is transferred or provided to a computer system via a network or other (wired, wireless, or a combination thereof) communication connection, this connection can be understood as a computer-readable medium. The computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the disclosure may be implemented in network computing environments having various kinds of computer system configurations such as PCs, laptop computers, handheld devices, multiprocessor systems, microprocessor-based or programmable consumer electronics, network PCs, minicomputers, mainframe computers, mobile phones, PDAs, pagers, and the like. The disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

At the outset, a system for analyzing a road surface condition based on a vehicle's noise according to embodiments of the present disclosure will be described. FIG. 1 is a diagram illustrating a system for analyzing a road surface condition based on a vehicle's noise according to embodiments of the present disclosure. Referring to FIG. 1, the system according to embodiments includes a traffic server 10, a plurality of sensor devices 20 managed by the traffic server 10, and a manager device 30.

The traffic server 10 is an apparatus configured to collect traffic information and provide the collected traffic information. In particular, the traffic server 10 may derive a dangerous area of a road 1 and provide information on the dangerous area. To this end, the traffic server 10 may receive audio signals from the plurality of sensor devices 20 installed on the side of the road 1 and analyze the received audio signals to set a dangerous area.

In addition, the traffic server 10 may receive an image signal obtained by photographing a vehicle on the road 1 and an audio signal corresponding to a vehicle's driving noise generated on a surface of the road 1 from the sensor device 20, and identify a road surface condition of the road 1 by analyzing the received image signal and audio signal. To this end, the traffic server 10 may determine the road surface condition of the road 1 by analyzing the image signal and the audio signal through at least one of a learned vehicle type recognition model (VRM) and a learned state recognition models (SRM).

The sensor devices 20 may be installed on the side of the road 1 and disposed to be spaced apart from each other by a predetermined distance. The sensor devices 20 may be arranged in a zigzag manner at both sides of the road 1 or may be arranged in a line at one side of the road 1. The sensor device 20 may include a camera for generating an image signal by photographing a vehicle traveling on the road, a microphone for obtaining an audio signal of a vehicle's driving noise generated on the road, a transceiver for transmitting the image signal and the audio signal to the traffic server 10, and a microcontroller unit (MCU) for controlling the camera, the microphone, and the transceiver. The sensor device 20 may be an Internet of Things (IoT) device. The sensor device 20 may access the traffic server 10 through a network and transmit the image signal and the audio signal to the traffic server 10. In case that there are a plurality of sensor devices 20, the plurality of sensor devices 20 may organize a sensor network. In this case, each of the plurality of sensor devices 20 may transmit the image signal and audio signal to any one sensor device 20, which may transmit a plurality of received images signals and audio signals to the traffic server 10.

The manager device 30 is an apparatus used by a manager responsible for managing the traffic server 10 and the sensor devices 20. The manager device 30 may be, for example, a smartphone, a tablet, a phablet, a notebook computer, or a personal computer. The manager device 30 may access the traffic server 10 in response to a manager's manipulation and perform necessary settings or receive information provided by the traffic server 10.

Figures 2, 3:
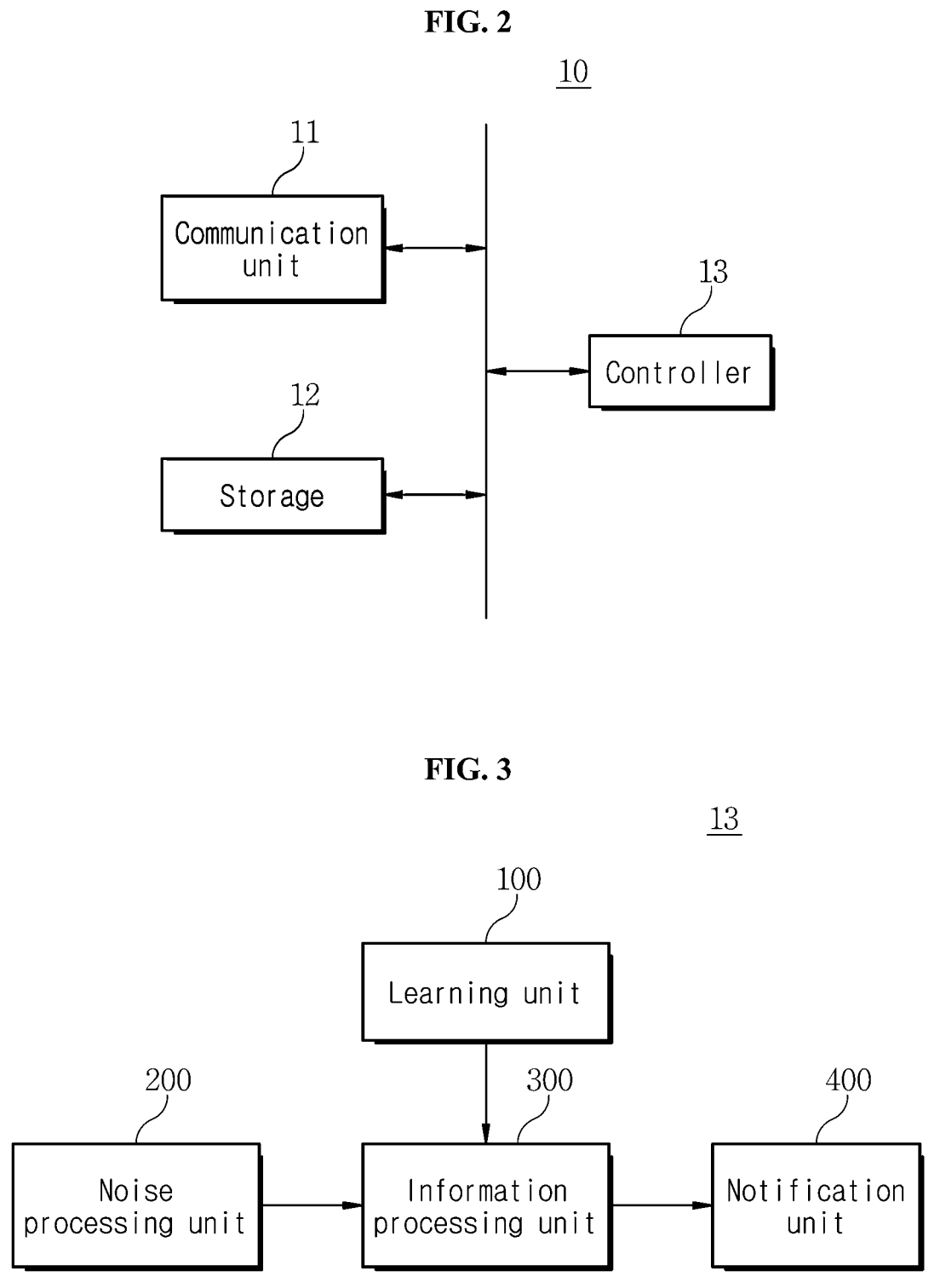
Figure 4:
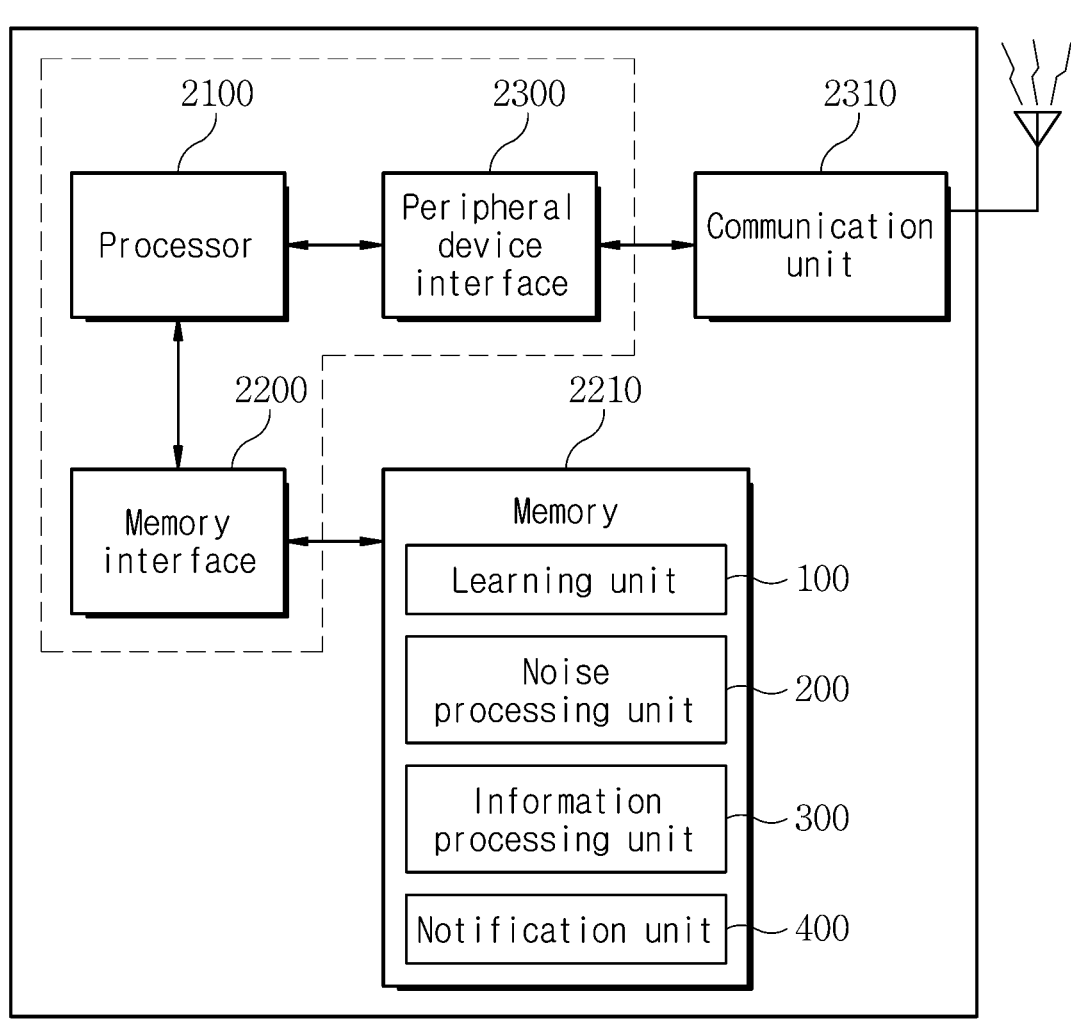
FIG. 4 is an exemplary diagram illustrating a hardware system for implementing the traffic server according to the first embodiment of the present disclosure.

Next, the traffic server 10 according to the first embodiment of the present disclosure will be described in more detail. FIG. 2 is a block diagram illustrating the configuration of a traffic server according to embodiments of the present disclosure. FIG. 3 is a block diagram illustrating a detailed configuration of a controller of a traffic server according to the first embodiment of the present disclosure. FIG. 4 is an exemplary diagram illustrating a hardware system for implementing the traffic server according to the first embodiment of the present disclosure.

Referring to FIG. 2, the traffic server 10 according to embodiments includes a communication unit 11, a storage 12, and a controller 13.

The communication unit 11 is configured to communicate with the sensor device 20 and the manager device 30 through a network. To transmit/receive data through a network, the communication unit 11 may include a modem for modulating a signal to be transmitted and demodulating a received signal. The communication unit 11 may transmit data, received from the controller 13, to other devices 20 and 30 through a network. Also, the communication unit 11 may transmit data, received from the other devices 20 and 30 through the network, to the controller 13.

The storage 12 is configured to store programs and data necessary for the operation of the traffic server 10. For example, the storage 12 may store an audio signal received from the sensor device 20, an attenuated audio signal obtained by removing noise other than a noise-of-interest from the audio signal, and the like. Various data stored in storage 12 may be registered, deleted, changed, or added according to manager's manipulations.

The controller 13 may control the overall operation of the traffic server 10 and the signal flow between internal blocks of the traffic server 10 and perform a data processing function. The controller 13 may be a central processing unit, an image processor, a graphic processing unit (GPU), a digital signal processor, or the like. As shown in FIG. 3, the controller 13 may include a learning unit 100, a noise processing unit 200, an information processing unit 300, and a notification unit 400.

The learning unit 100 is configured to generate a detection model (DM) according to an embodiment of the present disclosure. The detection model may be generated through machine learning or deep learning. The generated detection model may be provided to the information processing unit 300. The detection model may be a generative network that generates an imitated attenuated audio signal that imitates an inputted attenuated audio signal. The detection model may be, for example, a Restricted Boltzmann Machine (RBM), an Auto-Encoder (AE), or a Generative Adversarial Network (GAN). The detection model includes a plurality of layers. Also, each of the plurality of layers includes a plurality of operations. In addition, the plurality of layers are connected by weights. When there occurs an input to the detection model, the detection model derives an output by performing the plurality of operations in which such inter-layer weights are applied. The plurality of layers include one or a combination of a fully-connected layer, a convolutional layer, a recurrent layer, and a graph layer.

The noise processing unit 200 is configured to generate an attenuated audio signal by removing noise other than a noise-of-interest from the audio signal received from the sensor device 20. For example, the noise-of-interest may be at least one of a sudden brake noise of a vehicle and a noise of a horn of a vehicle.

The information processing unit 300 is configured to detect the noise-of-interest through the detection model. If the accumulated number of times the noise-of-interest is detected within a predetermined period is equal to or greater than a predetermined reference value, a road area within a predetermined radius from the sensor device 20 is set as a dangerous area (DA) of the road.

The notification unit 400 is configured to output a dangerous area warning message notifying the dangerous area set by the information processing unit 300. In addition, the notification unit 400 may provide the dangerous area warning message to the manager device 30 through the communication unit 11.

The operation of the controller 13 including the learning unit 100, the noise processing unit 200, the information processing unit 300, and the notification unit 400 will be described in more detail below.

The above-described components of the controller 13 may be implemented in the form of a software module, a hardware module, or a combination thereof executed by a processor.

The software module, the hardware module, or the combination thereof, executed by the processor, may be implemented as an actual hardware system such as a computer system.

Hereinafter, with reference to FIG. 4, a hardware system 2000 in which the controller for deriving a dangerous area of a road based on a vehicle's noise generated on the road according to a first embodiment of the present disclosure is implemented in hardware form will be described.

As shown in FIG. 4, the hardware system 2000 according to the first embodiment may have components including a processor 2100, a memory interface 2200, and a peripheral device interface 2300.

Each component in the hardware system 2000 may be an individual electronic component or be integrated in one or more integrated circuits, and these components may be electrically connected to each other via a bus system (not shown).

The bus system may include one or more individual physical buses, connected by suitable bridges, adapters, and/or controllers, communication lines/interfaces, and/or an abstraction representing multi-drop or point-to-point connections.

The processor 2100 communicates with the memory 2210 through the memory interface 2200 to perform various functions in the hardware system, thereby executing various software modules stored in the memory 2210.

In the memory 2210, the learning unit 100, the noise processing unit 200, the information processing unit 300, and the notification unit 400, which are components in the controller 13 described above with reference to FIG. 3, may be stored in the form of a software module. Also, an operating system (OS) or the like may be further stored.

The operating system may be, for example, an embedded operating system such as I-OS, Android, Darwin, RTXC, LINUX, UNIX, OS X, WINDOWS, or VxWorks. The operating system includes various procedures, instruction sets, software components, and/or drivers for controlling and managing general system tasks (e.g., memory management, storage device control, power management, etc.), and serves to facilitate communication between various hardware modules and software modules.

The memory 2210 may include, but is not limited to, a cache, a main memory, and a secondary memory. The memory 2210 may include a memory hierarchy implemented through any combination of a RAM (e.g., SRAM, DRAM, DDRAM), ROM, FLASH, magnetic and/or optical storage device (e.g., disk drive, magnetic tape, compact disk (CD), and digital video disc (DVD), etc.).

The peripheral device interface 2300 serves to enable communication between the processor 2100 and peripheral devices.

The peripheral devices are for providing different specific functions to the hardware system 2000. In the first embodiment, the peripheral devices may include, for example, a communication unit 2310.

The communication unit 2310 performs a communication function with other devices. To this end, the communication unit 2310 may include, but is not limited to, an antenna system, an RF transceiver, one or more amplifiers, a tuner, one or more oscillators, a digital signal processor, a CODEC chipset, a memory, and a suitable circuit.

The communication unit 2310 may support wired/wireless communication protocols. The wireless communication protocol may include, for example, wireless local area network (WLAN), digital living network alliance (DLNA), wireless broadband (Wibro), world interoperability for microwave access (Wimax), global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), LTE-Advanced (LTE-A), 5G communication system, wireless mobile broadband service (WMBS), Bluetooth, radio frequency identification (RFID), infrared data association (IrDA), ultra-wideband (UWB), ZigBee, near field communication (NFC), ultra sound communication (USC), visible light communication (VLC), Wi-Fi, Wi-Fi direct, and the like. In addition, the wired communication protocol may include, for example, wired LAN, wired wide area network (wired WAN), power line communication (PLC), USB communication, Ethernet, serial communication, optical/coaxial cable, and the like.

In the hardware system 2000 according to the first embodiment, each component stored in the form of a software module in the memory 2210 performs an interface with the communication unit 2310 through the memory interface 2200 and the peripheral device interface 2300 in the form of an instruction executed by the processor 2100.

Next, a method for deriving a dangerous area of a road based on a vehicle's noise generated on the road according to the first embodiment of the present disclosure will be described. Before describing this method, a method for generating a detection model (DM) through machine learning or deep learning will be described. FIG. 5 is a flowchart illustrating a method for generating a detection model (DM) for deriving a dangerous area of a road based on a vehicle's noise generated on the road according to the first embodiment of the present disclosure.

Referring to FIG. 5, at step S110, the learning unit 100 prepares training data for detecting a noise-of-interest, that is, an attenuated audio signal for training. The noise-ofinterest may be at least one of a sudden brake noise of a vehicle and a horn noise of a vehicle. The attenuated audio signal for training is a signal obtained by attenuating noise other than the noise-of-interest from an audio signal. Specifically, the attenuated audio signal for training may be generated by canceling a frequency band other than a frequency-of-interest band of the noise-of-interest from an audio signal. Here, the audio signal may be a signal collected through a microphone in the vicinity of a vehicle while the vehicle is driving.

At step S120, the learning unit 100 enters the attenuated audio signal for training to the detection model that does not complete learning. Then, at step S130, the detection model generates an imitated attenuated audio signal for training that imitates the attenuated audio signal for training, by compressing and restoring the attenuated audio signal for training through a plurality of operations in which a plurality of layer weights are applied to the attenuated audio signal for training. For example, when the detection model is an auto-encoder, the detection model includes an encoder and a decoder. In this case, the encoder of the detection model performs a plurality of operations in which a plurality of layer weights are applied to the attenuated audio signal for training, thereby compressing the attenuated audio signal for training and generating a latent vector, and the decoder of the detection model performs a plurality of operations in which a plurality of layer weights are applied to the latent vector generated by the encoder, thereby generating the imitated attenuated audio signal for training.

Then, at step S140, the learning unit 100 calculates a restoration loss indicating a difference between the attenuated audio signal for training and the imitated attenuated audio signal for training through a loss function, and performs optimization for updating the weight of the detection model through a backpropagation algorithm to minimize the restoration loss.

In case that the detection model is an auto-encoder, the restoration loss is calculated according to Equation 1 below.

$$\mathcal{L} = |x - D(E(x))| = |x - y| \qquad \text{[Equation 1]}$$

In Equation 1, E( ) represents an operation performed by the encoder, and D( ) represents an operation performed by the decoder. In addition, x represents an attenuated audio signal for training, and y represents an imitated attenuated audio signal for training. Also, L represents the restoration loss. Therefore, the restoration loss L represents a difference between the attenuated audio signal for training and the imitated attenuated audio signal for training.

Then, at step S150, the learning unit 100 determines whether a condition necessary for the end of learning is satisfied. This condition may be whether the restoration loss calculated at the step S140 is less than a predetermined target value. If it is determined at the step S150 that the condition necessary for the end of learning is not satisfied, that is, if the restoration loss calculated at the step S140 is equal to or greater than the target value, the process proceeds to the step S110 and repeats the steps S110 to S150. This means that learning is repeated using a plurality of different attenuated audio signals for training. On the other hand, if it is determined at the step S150 that the condition necessary for the end of learning is satisfied, that is, if the restoration loss calculated at the step S140 is less than the target value, the process proceeds to step S160 to end the learning.

Then, at step S170, the learning unit 100 derives a threshold value of the detection model.

According to an embodiment, the learning unit 100 prepares a plurality of attenuated audio signals for test. The attenuated audio signal for test is prepared in the same way as the attenuated audio signal for training. That is, the attenuated audio signal for test is a signal obtained by attenuating noise other than the noise-of-interest in the audio signal. As in the attenuated audio signal for training, the noise-of-interest may be at least one of a sudden brake noise of a vehicle and a horn noise of a vehicle.

Next, the learning unit 100 enters the plurality of attenuated audio signals for test into the detection model that does not complete learning. Then, the detection model generates a plurality of imitated attenuated audio signals for test imitating the plurality of attenuated audio signals for test. Thus, the learning unit 100 calculates the threshold value of the detection model through Equation 2 below.

$$\theta = \mu + (k \times \sigma) \qquad \text{[Equation 2]}$$

In Equation 2, $\theta$ denotes a threshold value. In addition, $\mu$ denotes the average of the mean squared error (MSE) between the plurality of test attenuated audio signals and the plurality of test imitated attenuated audio signals corresponding to the plurality of test attenuated audio signals. Also, $\sigma$ denotes the standard deviation of the mean squared error between the plurality of test attenuated audio signals and the plurality of test imitated attenuated audio signals corresponding to the plurality of test attenuated audio signals. Also, k denotes a weight for the standard deviation, and it is a preset value. The learning unit 100 provides the information processing unit 300 with the learning-completed detection model and the threshold value of the detection model.

Next, a method for deriving a dangerous area of a road based on a vehicle's noise generated on the road according to the first embodiment of the present disclosure will be described. FIG. 6 is a flowchart illustrating a method for deriving a dangerous area of a road based on a vehicle's noise generated on the road according to the first embodiment of the present disclosure.

In FIG. 6, it is assumed that the noise-of-interest is stored in the storage 12. The noise-of-interest is at least one of a vehicle's horn noise and a vehicle's sudden brake noise. The noise processing unit 200 may store the noise-of-interest in the storage 12 in response to an input received from the manager device 30 via the communication unit 11.

According to an embodiment, the noise itself, that is, the noise-of-interest in the form of a sound may be stored. In this case, the noise processing unit 200 may extract a dominant frequency of the noise and use it as a frequency-of-interest band. Here, the dominant frequency refers to a particular frequency component occupying a ratio of a predetermined value or more among all frequency components of the corresponding noise. In addition, for the corresponding noise, the noise processing unit 200 may store, as a frequency-of-interest pattern, at least one of the number of occurrences for each frequency component and the occurrence order of respective frequency components. According to another embodiment, a frequency-of-interest band and a frequency-of-interest pattern may be designated and stored as the noise-of-interest. In this case, the frequency-of-interest band may be designated in units of Hz. In addition, a frequency of an upper, lower, or middle N % region of an audio signal collected in percentage units may be designated as the frequency-of-interest band singly or multiply (where N is a predefined number). In case of the frequency-of-interest pattern, the number of occurrences for each frequency component and/or the occurrence order of respective frequency components may be designated.

Meanwhile, the plurality of sensor devices 20 disposed around the road 1 may collect audio signals through a microphone and transmit the collected audio signals to the traffic server 10. Thus, at step S210, the noise processing unit 200 may receive the audio signals from the plurality of sensor devices 20 through the communication unit 11.

Then, at step S220, the noise processing unit 200 generates an attenuated audio signal by attenuating noise other than the noise-of-interest stored in the storage 12 from the received audio signal. In this step S220, in order to generate the attenuated audio signal, the noise processing unit 200 converts the audio signal into a frequency domain through Fourier transform, etc. and cancels a frequency band other than a frequency-of-interest of the noise-of-interest from the audio signal by using one or more band filters. Here, as the band filter, a high-pass filter, a low-pass filter, a band-pass filter, a notch filter, and/or the like may be used. Additionally, the noise processing unit 200 may detect a dominant noise frequency from the audio signal in which a frequency band other than the frequency-of-interest of the noise-of-interest is cancelled, and cancel the detected dominant noise frequency.

Then, at step S230, the information processing unit 300 calculates a restoration error by analyzing the attenuated audio signal through the detection model learned. As described above with reference to FIG. 5, the detection model is generated using the attenuated audio signal for training. In order to detect the noise-of-interest, when the information processing unit 300 inputs the attenuated audio signal to the detection model, the detection model compresses and restores the attenuated audio signal and thereby generates an imitated attenuated audio signal that imitates the attenuated audio signal. Then, the information processing unit 300 calculates a restoration error that indicates a difference between the inputted attenuated audio signal and the imitated attenuated audio signal.

When the restoration error is calculated, the information processing unit 300 detects the noise-of-interest by determining at step S240 whether the restoration error is less than a predetermined threshold (Equation 2). That is, if it is determined at the step S240 that the restoration error is less than the predetermined threshold, the information processing unit 300 may detect, as the noise-of-interest, the attenuated audio signal inputted to the detection model at the step S230. On the other hand, if it is determined at the step S240 that the restoration error is greater than or equal to the predetermined threshold, the information processing unit 300 determines that the attenuated audio signal inputted to the detection model is not the noise-of-interest, and the process returns to the step S210.

When the noise-of-interest is detected, the information processing unit 300 accumulates at step S250 the number of times the noise-of-interest is detected.

Then, at step S260, the information processing unit 300 determines whether the accumulated number of times the noise-of-interest is detected within a predetermined period is equal to or greater than a predetermined reference value.

If it is determined at the step S260 that the accumulated number of times the noise-of-interest is detected within the predetermined period is less than the predetermined reference value, the process returns to the step S210 and the steps S210 to S260 are repeated.

On the other hand, if it determined at the step S260 that the accumulated number of times the noise-of-interest is detected within the predetermined period is greater than or equal to the predetermined reference value, the information processing unit 300 establishes, at step S270, a road area within a predetermined radius from the sensor device 20 as a dangerous area (DA) of the road.

When the dangerous area is established, the notification unit 400 outputs a dangerous area warning message notifying the dangerous area at step S280. At this time, the notification unit 400 may provide the dangerous area warning message to the manager device 30 through the communication unit 11. Also, the notification unit 400 may provide through the communication unit 11 the dangerous area warning message to a trip computer of the vehicle connected to the network.

As described above, the present disclosure derives traffic information based on audio signals. Therefore, since the cost of the audio processing equipment is lower than the equipment required for image processing, the cost of deriving traffic information can be reduced. Furthermore, according to the present disclosure, the equipment for collecting traffic information can be simply installed without separate construction as long as power is supplied regardless of a road type or a road surface type, and also the installation position can be easily changed or moved without additional construction. In addition, the present disclosure can automatically or semi-automatically adapt and respond to environmental changes by canceling all noises other than the noise-of-interest, and can automatically respond to changes in noise other than the noise-of-interest without being affected. In addition, according to the present disclosure, it is possible to semi-automatically respond to changes in the installation environment by redefining the noise-of-interest.

Figure 7:
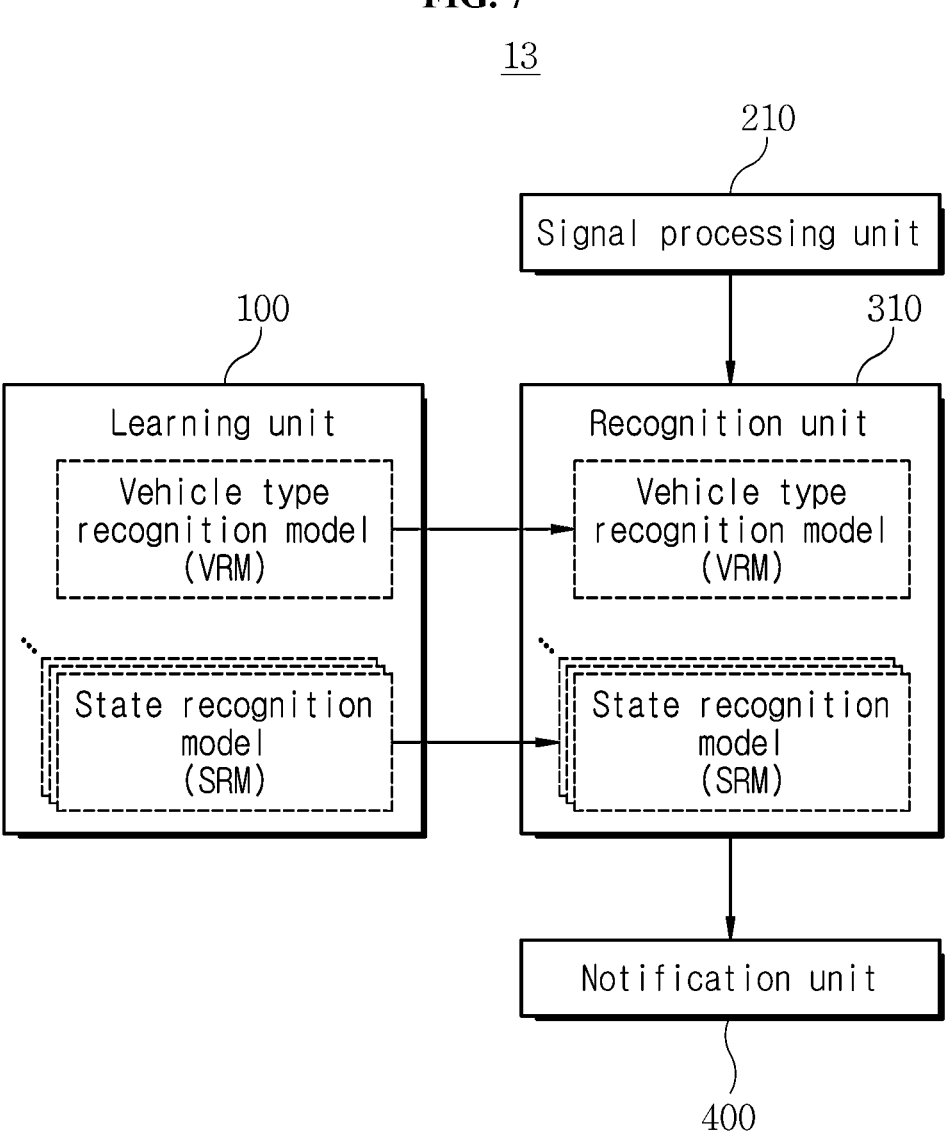
FIG. 7 is a block diagram illustrating a detailed configuration of a controller of a traffic server according to the second embodiment of the present disclosure.
Figure 8:
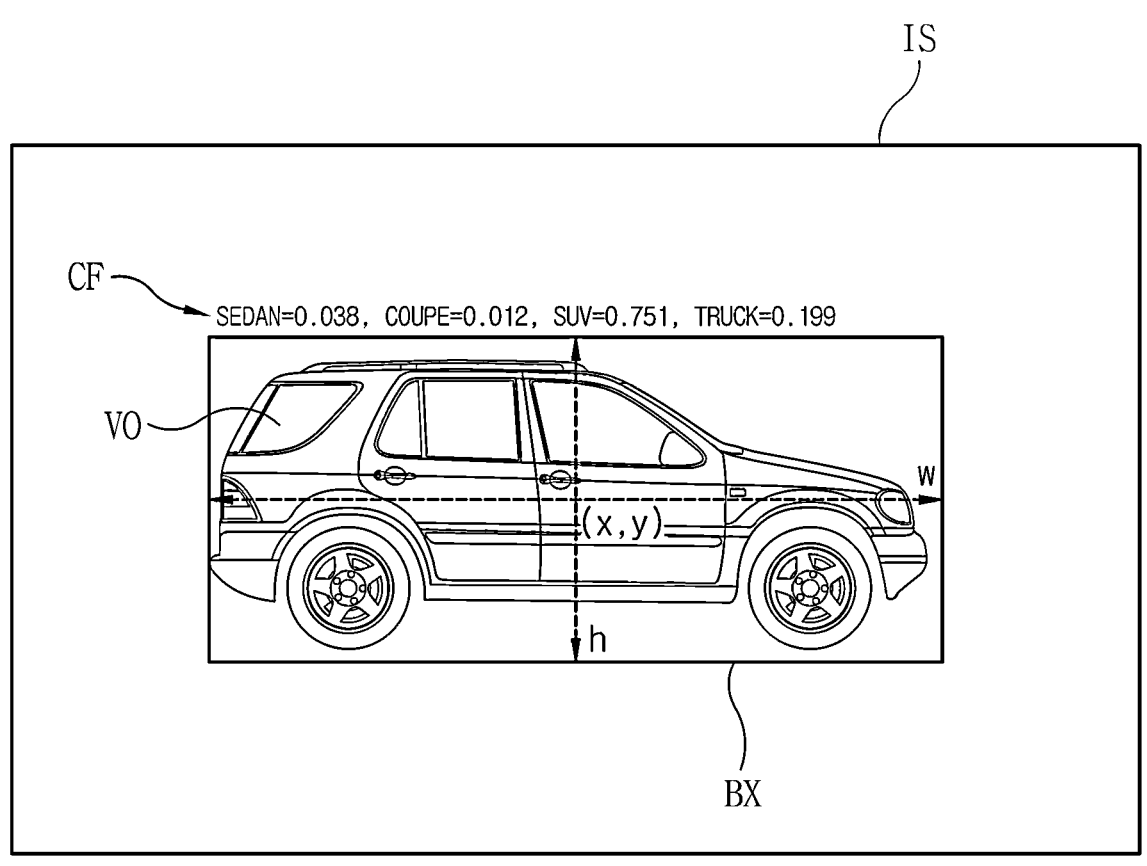
FIG. 8 is a diagram illustrating an output value or label of a vehicle type recognition model according to the second embodiment of the present disclosure.

Next, the analysis of the road surface condition based on the driving noise for each vehicle type according to the second embodiment of the present disclosure will be described. The configurations of the system in FIG. 1 and the traffic server in FIG. 2 described above may also be applied to the second embodiment. FIG. 7 is a block diagram illustrating a detailed configuration of a controller of a traffic server according to the second embodiment of the present disclosure. FIG. 8 is a diagram illustrating an output value or label of a vehicle type recognition model according to the second embodiment of the present disclosure.

Referring to FIG. 7, the controller 13 includes a learning unit 100, a signal processing unit 210, a recognition unit 310, and a notification unit 400.

The learning unit 100 is configured to generate a vehicle type recognition model (VRM) through machine learning or deep learning. When the vehicle type recognition model is generated, the learning unit 100 provides the generated vehicle type recognition model to the recognition unit 310.

The vehicle type recognition model includes a plurality of layers, and each of the plurality of layers performs a plurality of operations. In one layer, each of operation results of a plurality of operation modules is weighted and hen transmitted to the next layer. This means that a weight is applied to the operation result of one layer and the weighted result is inputted to the operation of the next layer. In other words, the vehicle type recognition model performs a plurality of operations in which a plurality of layer weights are applied. The plurality of layers include a convolution layer that performs a convolution operation, a pooling layer that performs a down-sampling operation or an up-sampling operation, a fully-connected layer (FL) that performs an operation based on an activation function, and the like. Each of the convolution, down-sampling, and up-sampling operations uses a kernel composed of a certain matrix, and the values of elements of the matrix constituting the kernel become weights. The activation function may be, for example, Sigmoid, Hyperbolic tangent (tanh), Exponential Linear Unit (ELU), Rectified Linear Unit (ReLU), Leakly ReLU, Maxout, Minout, Softmax, and the like. The vehicle type recognition model may be, for example, a model to which an algorithm based on Convolution Neural Network (CNN), You Only Look Once (YOLO), Single Shot Detector (SSD), CornerNet, CenterNet, or the like is applied.

Referring to FIG. 8, when an image signal (IS) is inputted, the vehicle type recognition model performs a plurality of operations in which a plurality of layer weights are applied, and thereby calculates output values including a bounding box (BX) and confidence (CF). The bounding box represents an area occupied by a vehicle object (VO) in the image signal. The confidence represents a probability that the vehicle in the bounding box belongs to each of the plurality of vehicle types. The bounding box is expressed through the center coordinates (x, y), the width (w), and the height (h). The confidence indicates a plurality of vehicle types and a probability for each of the plurality of vehicle types. For example, it is assumed that there are four vehicle types (SEDAN, COUPE, SUV, and TRUCK). In this case, as shown in FIG. 8, the output value of the vehicle type recognition model may be BX=(x, y, w, h), [SEDAN, COUPE, SUV, TRUCK]=[0.038, 0.012, 0.751, 0.199]. As such, the bounding box may represent the area occupied by the vehicle in the image signal through the center coordinates (x, y), the width (w), and the height (h). In addition, the confidence may indicate the probability that the vehicle object in the bounding box belongs to each of the plurality of vehicle types, through probability expressions of 4% (0.038), 1% (0.012), 75% (0.751), 20% (0.199) calculated for the respective vehicle types (SEDAN, COUPE, SUV, TRUCK).

The learning unit 100 is configured to generate a plurality of state recognition models (SRM) through machine learning or deep learning. The learning unit 100 provides the plurality of generated state recognition models to the recognition unit 310. Each of the plurality of state recognition models corresponds to each of the plurality of vehicle types. Therefore, each of the plurality of state recognition models is trained through training data based on a driving noise generated when a vehicle of the corresponding vehicle type travels on a road. This learning method will be described in more detail below.

The state recognition model may be a classification network that calculates a predictive value that is a probability for each of a plurality of road surface conditions (e.g., normal, hydroplaning, icy, snow-covered). The state recognition model may be, for example, a Convolution Neural Network (CNN), a Recurrent Neural Network (RNN), or the like. The state recognition model includes a plurality of layers, and each of the plurality of layers performs a plurality of operations. In one layer, each of operation results of a plurality of operation modules is weighted and hen transmitted to the next layer. This means that a weight is applied to the operation result of one layer and the weighted result is inputted to the operation of the next layer. In other words, the state recognition model performs a plurality of operations in which a plurality of layer weights are applied. The plurality of layers of the state recognition model include one or a combination of a fully-connected layer, a convolution layer, a recurrent layer, a graph layer, and a pooling layer. The plurality of operations may be, for example, a convolution operation, a down-sampling operation, an up-sampling operation, an operation by an activation function, and the like. The activation function may be, for example, Sigmoid, Hyperbolic tangent (tanh), Exponential Linear Unit (ELU), Rectified Linear Unit (ReLU), Leakly ReLU, Maxout, Minout, Softmax, and the like.

When an audio-of-interest signal is inputted, the state recognition model performs a plurality of operations in which a plurality of layer weights are applied, and thereby computes a predictive value for each of the road surface conditions (e.g., normal, hydroplaning, icy, snow-covered). The predictive value is a predicted probability for each of a plurality of predetermined road surface conditions. For example, assuming that the predetermined road surface conditions are four including normal, hydroplaning, icy, and snow-covered, the predictive value represents probabilities of four conditions. For example, the predictive value may be expressed as '(normal, hydroplaning, icy, snow-covered)= [0.01, 0.02, 0.17, 0.80]'. This means that the probability that the road surface is in a normal condition is 1%, the probability that the road surface is in a hydroplaning condition is 2%, the probability that the road surface is in an icy condition is 17%, and the probability that the road surface is in a snow-covered condition is 80%.

The signal processing unit 210 is configured to receive an image signal and an audio signal from the sensor device 20, detect an audio-of-interest signal from the received audio signal, and provide the image signal and the audio-of-interest signal to the recognition unit 310.

The audio-of-interest signal refers to an audio signal of a frequency-of-interest band among audio signals. The frequency-of-interest band refers to a frequency band in which driving noise is generated. The frequency-of-interest band may be predetermined. Specifically, a dominant frequency band of the driving noise generated as the vehicle is driven may be set as the frequency-of-interest band. The dominant frequency band refers to a frequency band that is repeatedly detected a predetermined number of times or more among frequency bands detected from different driving noises. For example, a frequency band that is repeatedly detected a specific number of times or more among frequency bands detected from a plurality of driving noises collected a plurality of number of times may be the dominant frequency band.

The recognition unit 310 may recognize the vehicle type by analyzing the image signal through the trained vehicle type recognition model. After recognizing the vehicle type, the recognition unit 310 selects the trained state recognition model corresponding to the recognized vehicle type from among a plurality of state recognition models trained for respective vehicle types, and inputs the audio-of-interest signal to the selected state recognition model. Then, the selected state recognition model performs a plurality of operations in which a plurality of trained layer weights are applied to the inputted audio-of-interest signal, and thereby calculates a predictive value that is a predicted probability for each of the plurality of road surface conditions. Then, based on the predictive value, the recognition unit 310 recognizes the road surface condition.

The notification unit 400 is configured to provide the road surface condition recognized by the recognition unit 310 to the manager device 30. Also, the notification unit 400 may provide the road surface condition to a trip computer of the vehicle.

Figure 10:
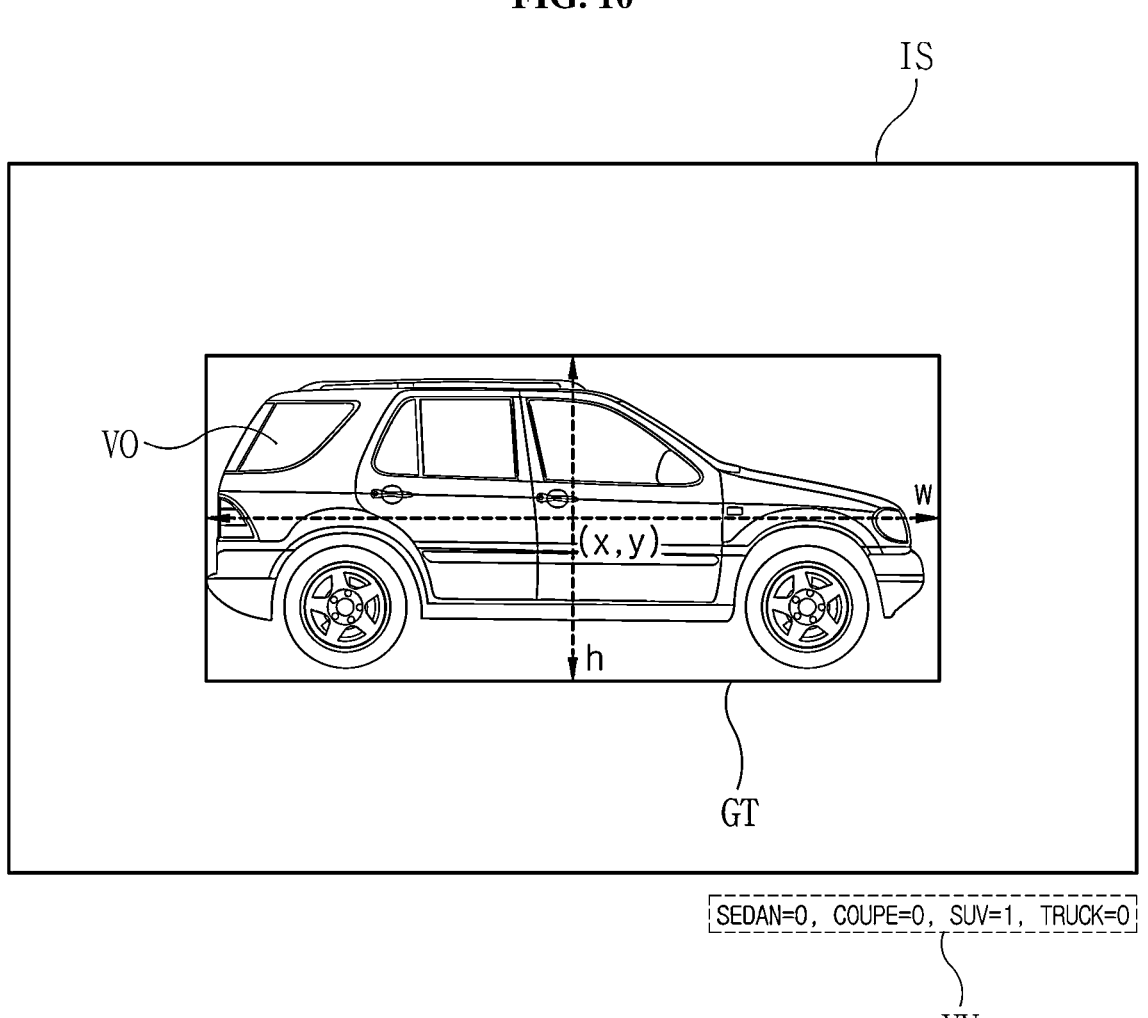
FIG. 10 is a diagram illustrating learning data of a vehicle type recognition model according to the second embodiment of the present disclosure.

Next, a method for generating a vehicle type recognition model (VRM) according to a second embodiment of the present disclosure will be described. FIG. 9 is a flowchart illustrating a method for generating a vehicle type recognition model according to the second embodiment of the present disclosure. FIG. 10 is a diagram illustrating learning data of a vehicle type recognition model according to the second embodiment of the present disclosure.

Referring to FIG. 9, at step S310, the learning unit 100 prepares training data for training the vehicle type recognition model. The training data includes an image signal for training and a label corresponding to the training image signal. As shown in FIG. 10, the image signal (IS) for training is an image of a vehicle. That is, the training image signal contains a vehicle object (VO). The label may be a ground-truth (GT) and a vehicle type vector (VV). The ground-truth indicates an area occupied by the vehicle object contained in the training image signal. As shown in FIG. 10, the ground-truth may be composed of center coordinates (x, y) and width and height (w, h). The vehicle type vector indicates the vehicle type of the vehicle object in the ground-truth. For example, if the vehicle type vector is in the form of a one-hot-encoding vector and the vehicle type of the vehicle object is SUV, the vehicle type vector may be [SEDAN, COUPE, SUV, TRUCK]=[0, 0, 1, 0].

When the training data is prepared, the learning unit 100 inputs at step S320 a training image signal to the vehicle type recognition model that does not complete learning. Then, at step S330, the vehicle type recognition model performs a plurality of operations in which unlearned weights between layers are applied to the training image signal, and thereby calculates an output value for training including a bounding box (BX) and confidence (CF). For example, the output value for training may be "BX=(x1, y1, w1, h1), [SEDAN, COUPE, SUV, TRUCK]=[0.038, 0.012, 0.751, 0.199]" as shown in FIG. 8.

Then, at step S340, the learning unit 100 calculates a composite loss representing a difference between the output value for training and the label, through a loss function. The composite loss includes a coordinate loss indicating a coordinate difference between the bounding box (BX) of the training output value and the ground-truth (GT) of the label, and a division loss indicating a difference between the confidence (CF) of the training output value and the vehicle type vector (VV) of the label.

Then, at step S350, the learning unit 100 performs optimization for correcting the weight of the vehicle type recognition model to minimize the composite loss derived through the loss function.

The above steps S320 to S350 are repeatedly performed using a plurality of different training data, and thus the weight of the vehicle type recognition model is repeatedly updated. Such iteration is performed until the composite loss becomes less than or equal to a predetermined target value. Therefore, at step S360, the learning unit 100 determines whether the composite loss calculated at the step S340 is less than or equal to the predetermined target value. If the composite loss is less than or equal to the predetermined target value, the learning of the vehicle type recognition model is completed at step S370.

As described above, each of the plurality of state recognition models (SRM) corresponds to a vehicle type. For example, one state recognition model may correspond to a sedan, and another state recognition model may correspond to a truck. Now, a method for generating any one of the plurality of state recognition models according to the second embodiment of the present disclosure will be described.

FIG. 11 is a flowchart illustrating a method for generating a state recognition model according to the second embodiment of the present disclosure.

Referring to FIG. 11, at step S410, the learning unit 100 prepares training data for the state recognition model. The training data includes an audio-of-interest signal for training and a label. An audio signal, which is the basis of the audio-of-interest signal for training, is collected from a driving noise generated when a vehicle having a type corresponding to the state recognition model, which is the learning target, is driven on a road. In addition, the training audio signal refers to an audio signal of a frequency-of-interest band among audio signals. The frequency-of-interest band refers to a frequency band in which a driving noise is generated. The frequency-of-interest band may be predetermined. In this case, a dominant frequency band of the driving noise generated as the vehicle is driven may be set as the frequency-of-interest band. The dominant frequency band refers to a frequency band that is repeatedly detected a predetermined number of times or more among frequency bands detected from different driving noises. For example, a frequency band that is repeatedly detected a specific number of times or more among frequency bands detected from a plurality of driving noises collected a plurality of number of times may be the dominant frequency band. Also, the label may be a state vector value indicating the road surface condition corresponding to the audio-of-interest signal for training. For example, the label may be a one-hot-encoding vector indicating any one of normal, hydroplaning, icy, and snow-covered conditions.

At step S420, the learning unit 100 inputs the training audio-of-interest signal into the state recognition model. Then, at step S430, the state recognition model calculates a predictive value for training through a plurality of operations in which unlearned weights between layers are applied. The predictive value for training indicates a predicted probability for each of a plurality of road surface conditions.

Then, at step S440, the learning unit 100 calculates a classification loss indicating a difference between the predictive value for training and the label, i.e., the state vector value, through a loss function. For example, the learning unit 100 may obtain the classification loss through a binary cross-entropy function that is the loss function.

Then, at step S450, the learning unit 100 performs optimization for correcting the weight of the state recognition model to minimize the classification loss derived through the loss function.

The above steps S420 to S450 are repeatedly performed using a plurality of different training data, and thus the weight of the state recognition model is repeatedly updated. Such iteration is performed until the classification loss becomes less than or equal to a predetermined target value. Therefore, at step S460, the learning unit 100 determines whether the classification loss calculated at the step S440 is less than or equal to the predetermined target value. If the classification loss is less than or equal to the predetermined target value, the learning of the state recognition model is completed at step S470.

Figure 12:
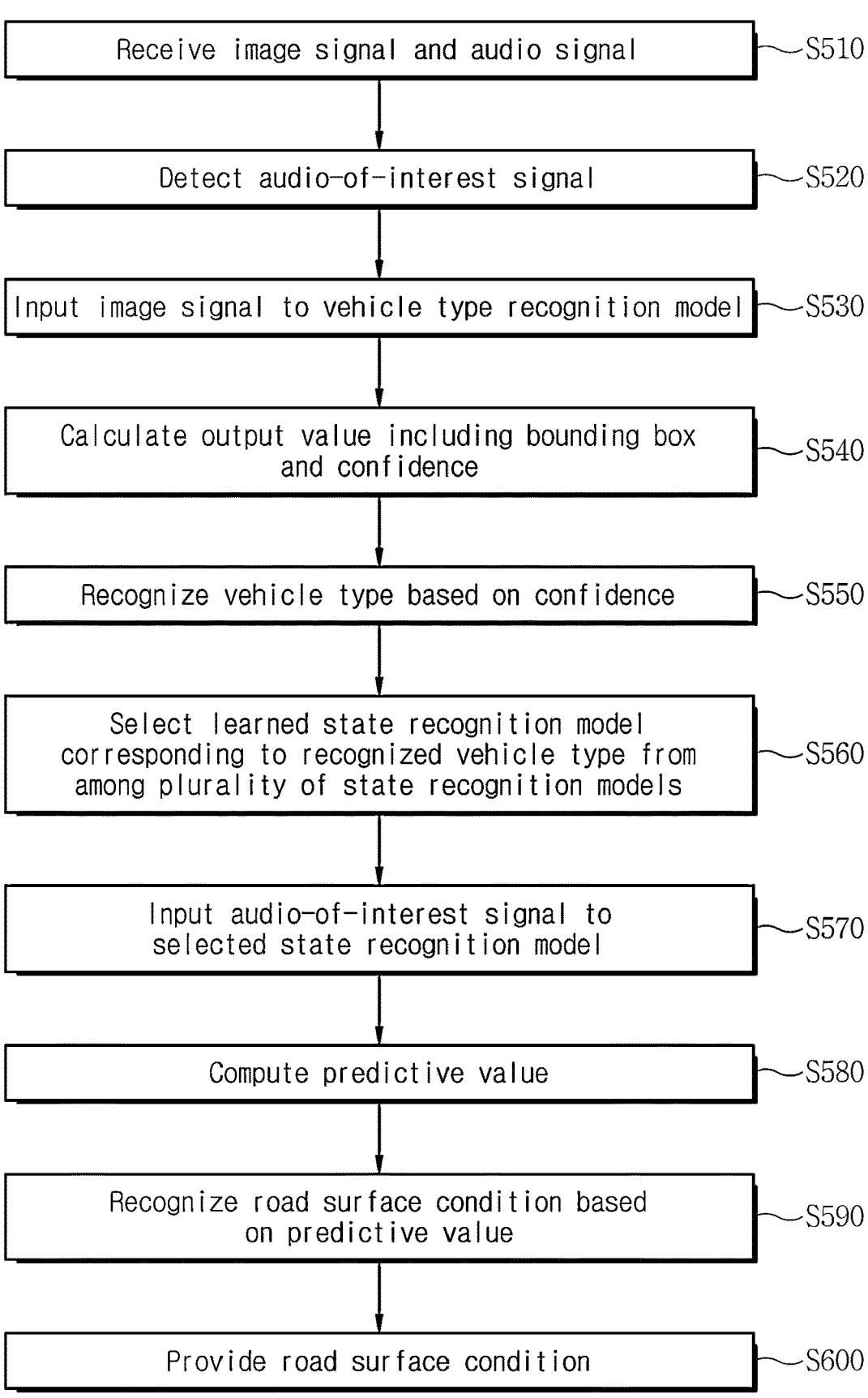
FIG. 12 is a flowchart illustrating a method for analyzing a road surface condition based on a driving noise for each vehicle type according to the second embodiment of the present disclosure.

Next, a method for analyzing a road surface condition based on a driving noise for each vehicle type according to the second embodiment of the present disclosure will be described. FIG. 12 is a flowchart illustrating a method for analyzing a road surface condition based on a driving noise for each vehicle type according to the second embodiment of the present disclosure.

Referring to FIG. 12, at step S510, the signal processing unit 210 may receive an image signal of a vehicle photographed from the sensor device 20 and an audio signal that is a noise generated on a road surface according to the driving of the vehicle.

Then, at step S520, the signal processing unit 210 detects an audio-of-interest signal, which is an audio signal having a predetermined frequency-of-interest band, from the received audio signal, and provides the received image signal and the detected audio-of-interest signal to the recognition unit 310. The frequency-of-interest band refers to a dominant frequency band of driving noise.

Then, at step S530, the recognition unit 310 inputs the image signal to a learned vehicle type recognition model. Then, at step S540, the vehicle type recognition model performs a plurality of operations in which a plurality of layer weights are applied, and thereby calculates an output value including a bounding box (BX) and confidence (CF) together with the image signal as shown in FIG. 8. The bounding box represents an area occupied by a vehicle object in the image signal. The confidence refers to a probability that the vehicle in the bounding box belongs to each of the plurality of vehicle types. The bounding box is expressed through the center coordinates (x, y), the width (w), and the height (h). The confidence indicates a plurality of vehicle types and a probability for each of the plurality of vehicle types. For example, it is assumed that there are four vehicle types (SEDAN, COUPE, SUV, and TRUCK). In this case, as shown in FIG. 8, the output value of the vehicle type recognition model may be BX=(x, y, w, h), [SEDAN, COUPE, SUV, TRUCK]=[0.038, 0.012, 0.751, 0.199]. As such, the bounding box may represent the area occupied by the vehicle in the image signal through the center coordinates (x, y), the width (w), and the height (h). In addition, the confidence may indicate the probability that the vehicle object in the bounding box belongs to each of the plurality of vehicle types, through probability expressions of 4% (0.038), 1% (0.012), 75% (0.751), 20% (0.199) calculated for the respective vehicle types (SEDAN, COUPE, SUV, TRUCK).

Then, at step S550, the recognition unit 310 recognizes the vehicle type of the vehicle according to the confidence of the output value. If the confidence is [SEDAN, COUPE, SUV, TRUCK]=[0.038, 0.012, 0.751, 0.199], the recognition unit 310 recognizes the vehicle type as an SUV because the probability that the vehicle object in the bounding box belongs to each of vehicle types (SEDAN, COUPE, SUV, TRUCK) is 4% (0.038), 1% (0.012), 75% (0.751), and 20% (0.199).

When the vehicle type is recognized, the recognition unit 310 selects a learned state recognition model corresponding to the recognized vehicle type from among the plurality of state recognition models at step S560. For example, if the recognized vehicle type is SUV, a state recognition model trained using the driving noise of the SUV as training data is selected. Thus, at step S570, the recognition unit 310 inputs the audio-of-interest signal to the state recognition model selected at the step S560.

Then, at step S580, the selected state recognition model performs a plurality of operations in which a plurality of layer weights are applied to the inputted audio-of-interest signal, and thereby computes a predictive value for each of the road surface conditions (e.g., normal, hydroplaning, icy, snow-covered). The predictive value is a predicted probability for each of a plurality of predetermined road surface conditions. For example, assuming that the predetermined road surface conditions are four including normal, hydroplaning, icy, and snow-covered, the predictive value represents probabilities of four conditions. For example, the predictive value may be expressed as '(normal, hydroplaning, icy, snow-covered)=[0.01, 0.02, 0.17, 0.80]'. This means that the probability that the road surface is in a normal condition is 1%, the probability that the road surface is in a hydroplaning condition is 2%, the probability that the road surface is in an icy condition is 17%, and the probability that the road surface is in a snow-covered condition is 80%.

Then, at step S590, the recognition unit 310 recognizes the road surface condition according to the predictive value. In the above-described example, the recognition unit 310 may recognize the road surface condition as the snow-covered condition having the highest predictive value.

Then, at step S600, the notification unit 400 may provide the manager device 30 with the road surface condition recognized by the recognition unit 310. At the step S400, the notification unit 400 may provide the road surface condition to a trip computer of the vehicle through a network.

Meanwhile, the apparatus according to the second embodiment of the present disclosure may be implemented using the hardware system 2000 described above in FIG. 4. In this case, each of the learning unit 100, the signal processing unit 210, the recognition unit 310, and the notification unit 400 described with reference to FIG. 7 may be stored in the memory 2210 in the form of a software module, and an operating system (OS) may be additionally stored. The configuration including the learning unit 100, the signal processing unit 210, the recognition unit 310, and the notification unit 400 may be loaded into the processor 2100 and executed.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

Certain embodiments of the subject matter described herein have been described. Other embodiments are within the scope of the following claims. For example, the operations recited in the claims may be performed in a different order and still achieve desirable results. By way of example, the process illustrated in the accompanying drawings does not necessarily require a particular illustrated sequence or sequential order to obtain desired results. In certain implementations, multitasking and parallel processing may be advantageous.

While this disclosure has been particularly shown and described with reference to an exemplary embodiment thereof, it will be understood by those skilled in the art that various changes in form and details may be made therein without departing from the scope of this disclosure as defined by the appended claims.

What is claimed is:

1. A method for analyzing a road surface condition, comprising:

receiving, by a signal processing unit, an image signal of a vehicle and an audio signal that is a noise generated on a road surface by driving of the vehicle;

generating, by the signal processing unit, an audio-of-interest signal by detecting an audio signal of a frequency-of-interest band from the received audio signal; and recognizing, by a recognition unit, the road surface condition by analyzing the image signal and the audio-of-interest signal through a learned vehicle type recognition model and one of a plurality of learned state recognition models, wherein the method further comprises:

before receiving the audio signal, preparing, by a learning unit, training data including a training audio-of-interest signal and a label corresponding to the training audio-of-interest signal;

inputting, by the learning unit, the training audio-of-interest signal to a state recognition model that does not complete learning;

calculating, by the state recognition model, a predictive value for training indicating a predicted probability for each of a plurality of road surface conditions, by performing a plurality of operations in which unlearned weights between layers are applied;

calculating, by the learning unit, a classification loss indicating a difference between the predictive value for training and the label; and performing, by the learning unit, optimization of updating a weight of the state recognition model to minimize the classification loss.

2. The method of claim 1, wherein recognizing the road surface condition includes:

recognizing, by the recognition unit, a vehicle type by analyzing the image signal through the learned vehicle type recognition model;

selecting, by the recognition unit, a learned state recognition model corresponding to the recognized vehicle type from among the plurality of state recognition models learned for respective vehicle types;

computing, by the recognition unit, a predictive value, which is a probability predicted for each of a plurality of road surface conditions, by analyzing the audio-of-interest signal through the selected learned state recognition model; and recognizing, by the recognition unit, the road surface condition according to the predictive value.

3. The method of claim 2, wherein recognizing the vehicle type includes:

inputting, by the recognition unit, the image signal to the learned vehicle type recognition model;

calculating, by the vehicle type recognition model, an output value including a bounding box indicating an area occupied by a vehicle object in the image signal and a confidence indicating a probability that the vehicle object in the bounding box belongs to each of a plurality of vehicle types by performing an operation in which a plurality of learned layer weights are applied to the image signal; and recognizing, by the recognition unit, the vehicle type of the vehicle object according to the confidence.

4. The method of claim 1, further comprising:

before receiving the audio signal, preparing, by a learning unit, training data including a training image signal and a label, the training image signal being obtained by photographing a vehicle, and the label including a ground-truth indicating an area occupied by a vehicle object contained in the training image signal and a vehicle type vector indicating the vehicle type of the vehicle object in the ground-truth;

inputting, by the learning unit, the training image signal to a vehicle type recognition model that does not complete learning;

calculating, by the vehicle type recognition model, an output value for training including a bounding box indicating an area occupied by a vehicle object in the image signal and a confidence indicating a probability that the vehicle object in the bounding box belongs to each of a plurality of vehicle types by performing a plurality of operations in which unlearned weights between layers are applied to the training image signal;

calculating, by the learning unit, a composite loss including a coordinate loss indicating a coordinate difference between the bounding box and the ground-truth and a division loss indicating a difference between the confidence and the vehicle type vector; and performing, by the learning unit, optimization of updating a weight of the vehicle type recognition model to minimize the composite loss.

5. An apparatus for analyzing a road surface condition, comprising:

a signal processing unit configured to receive an image signal of a vehicle and an audio signal that is a noise generated on a road surface by driving of the vehicle, and to generate an audio-of-interest signal by detecting an audio signal of a frequency-of-interest band from the received audio signal;

a recognition unit configured to recognize the road surface condition by analyzing the image signal and the audio-of-interest signal through a learned vehicle type recognition model and one of a plurality of learned state recognition models; and a learning unit configured to:

prepare training data including a training audio-of-interest signal and a label corresponding to the training audio-of-interest signal;

input the training audio-of-interest signal to a state recognition model that does not complete learning;

when the state recognition model calculates a predictive value for training indicating a predicted probability for each of a plurality of road surface conditions, by performing a plurality of operations in which unlearned weights between layers are applied:

calculate a classification loss indicating a difference between the predictive value for training and the label; and perform optimization of updating a weight of the state recognition model to minimize the classification loss.

6. The apparatus of claim 5, wherein the recognition unit is configured to:

recognize a vehicle type by analyzing the image signal through the learned vehicle type recognition model;

select a learned state recognition model corresponding to the recognized vehicle type from among the plurality of state recognition models learned for respective vehicle types;

compute a predictive value, which is a probability predicted for each of a plurality of road surface conditions, by analyzing the audio-of-interest signal through the selected learned state recognition model; and recognize the road surface condition according to the predictive value.

7. The apparatus of claim 6, wherein the recognition unit is configured to:

input the image signal to the learned vehicle type recognition model; and when the vehicle type recognition model calculates an output value including a bounding box indicating an area occupied by a vehicle object in the image signal and a confidence indicating a probability that the vehicle object in the bounding box belongs to each of a plurality of vehicle types by performing an operation in which a plurality of learned layer weights are applied to the image signal, recognize the vehicle type of the vehicle object according to the confidence.

8. The apparatus of claim 5, wherein the learning unit is further configured to:

prepare training data including a training image signal and a label, the training image signal being obtained by photographing a vehicle, and the label including a ground-truth indicating an area occupied by a vehicle object contained in the training image signal and a vehicle type vector indicating the vehicle type of the vehicle object in the ground-truth;

input the training image signal to a vehicle type recognition model that does not complete learning;

when the vehicle type recognition model calculates an output value for training including a bounding box indicating an area occupied by a vehicle object in the image signal and a confidence indicating a probability that the vehicle object in the bounding box belongs to each of a plurality of vehicle types by performing a plurality of operations in which unlearned weights between layers are applied to the training image signal, calculate a composite loss including a coordinate loss indicating a coordinate difference between the bounding box and the ground-truth and a division loss indicating a difference between the confidence and the vehicle type vector; and perform optimization of updating a weight of the vehicle type recognition model to minimize the composite loss.

\* \* \* \* \*